US010893212B2

(12) United States Patent
Masuda

(10) Patent No.: US 10,893,212 B2
(45) Date of Patent: Jan. 12, 2021

(54) SPHERICALLY-ARRANGED IMAGING ARRAY HAVING PAIRS OF CAMERAS WITH OVERLAPPING FIELDS OF VIEW

(71) Applicant: SONY CORPORATION, Tokyo (JP)

(72) Inventor: Tooru Masuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/477,939

(22) PCT Filed: Jan. 16, 2018

(86) PCT No.: PCT/JP2018/000919
§ 371 (c)(1),
(2) Date: Jul. 15, 2019

(87) PCT Pub. No.: WO2018/139250
PCT Pub. Date: Aug. 2, 2018

(65) Prior Publication Data
US 2019/0364223 A1 Nov. 28, 2019

(30) Foreign Application Priority Data
Jan. 26, 2017 (JP) ................. 2017-012277

(51) Int. Cl.
*H04N 5/247* (2006.01)
*G06T 7/55* (2017.01)
*H04N 5/232* (2006.01)

(52) U.S. Cl.
CPC ............. *H04N 5/247* (2013.01); *G06T 7/55* (2017.01); *H04N 5/23238* (2013.01)

(58) Field of Classification Search
CPC ....... H04N 5/247; H04N 5/23238; G06T 7/55
See application file for complete search history.

(56) References Cited

U.S. PATENT DOCUMENTS 9,973,694 B1 * 5/2018 van Hoff ............ H04N 5/23238
2011/0249100 A1 * 10/2011 Jayaram ............... H04N 13/243
348/48
(Continued)

FOREIGN PATENT DOCUMENTS

JP 2001-285692 A 10/2001
JP 2003-141527 A 5/2003
(Continued)

OTHER PUBLICATIONS

Okutomi et al., A Multiple-Baseline Stereo, IEEE Transactions on Pattern Analysis and Machine Intelligence, Apr. 1993, pp. 355-363, vol. 15, No. 4, IEEE.

*Primary Examiner* — Jamie J Atala
*Assistant Examiner* — Michael Robert Cammarata
(74) *Attorney, Agent, or Firm* — Paratus Law Group, PLLC

(57) ABSTRACT

There is provided an all-celestial imaging apparatus enabling imaging of images that enable estimation of depth information relating to an object to be imaged by suppressing any generation of occlusion. An all-celestial imaging apparatus that is an aspect of the present technique includes plural imaging parts each arranged being directed in a direction different from that of each other, and the plural imaging parts are arranged such that all imaging ranges on at least one circumference of the imaging ranges by the plural imaging parts are each overlapped by angles of view of two or more pairs of the imaging parts. The present technique is applicable to, for example, an all-celestial camera imaging images that are used in the case where the depth information on a distance to an object to be imaged that may be present in an optional direction of all azimuth directions of 360° is estimated.

9 Claims, 18 Drawing Sheets

(56) References Cited

U.S. PATENT DOCUMENTS

| | | | | |
|---|---|---|---|---|
| 2015/0054913 A1* | 2/2015 | Annau | ............... | G06F 3/013 |
| | | | | 348/36 |
| 2015/0348580 A1* | 12/2015 | van Hoff | ............ | G06T 3/4038 |
| | | | | 348/38 |
| 2016/0088287 A1* | 3/2016 | Sadi | ............ | G03B 35/08 |
| | | | | 348/43 |
| 2016/0352982 A1* | 12/2016 | Weaver | ............ | H04N 5/23238 |
| 2017/0006219 A1* | 1/2017 | Adsumilli | ......... | H04N 5/23219 |
| 2017/0078653 A1* | 3/2017 | Bi | ............ | G06T 3/0062 |
| 2017/0363949 A1* | 12/2017 | Valente | ............ | H04N 13/161 |
| 2018/0139431 A1* | 5/2018 | Simek | ............ | H04N 13/254 |

FOREIGN PATENT DOCUMENTS

| | | |
|---|---|---|
| JP | 2014-115374 A | 6/2014 |
| WO | WO 2016/055688 A1 | 4/2016 |

* cited by examiner

FIG. 6

| LATITUDE | 90 | 70 | 50 | 30 | 10 | -10 | -30 | -50 | -70 | -90 | TOTAL |
|---|---|---|---|---|---|---|---|---|---|---|---|
| QUANTITY | 1 | 4 | 7 | 9 | 11 | 11 | 9 | 7 | 4 | 1 | 64 |

SPHERICALLY-ARRANGED IMAGING ARRAY HAVING PAIRS OF CAMERAS WITH OVERLAPPING FIELDS OF VIEW

CROSS REFERENCE TO PRIOR APPLICATION

This application is a National Stage Patent Application of PCT International Patent Application No. PCT/JP2018/000919 (filed on Jan. 16, 2018) under 35 U.S.C. § 371, which claims priority to Japanese Patent Application No. 2017-012277 (filed on Jan. 26, 2017), which are all hereby incorporated by reference in their entirety.

TECHNICAL FIELD

The present technique relates to an all-celestial imaging apparatus and particularly to an all-celestial imaging apparatus adapted to image an image that enables estimation of a distance to an object to be imaged that may be present in each of all the directions of 360°.

BACKGROUND ART

In the past, many all-celestial cameras each capable of imaging in all the directions of 360° have been proposed (see e.g., PTL 1).

Many of the existing all-celestial cameras each produce a two-dimensional all-celestial image by piecing together the images imaged by plural cameras arranged therein each being directed in a direction different from that of each other, and an all-celestial content based on the two-dimensional all-celestial image can be viewed using, for example, an HMD (Head Mounted Display) that utilizes the VR (virtual Reality) technique.

Moreover, among the existing all-celestial cameras, the one is present that has plural cameras densely arranged therein in the circumferential direction for their angles of view (their imaging ranges) to each partially overlap on each other (hereinafter, referred to as "overlapping") and with which a distance to an object to be imaged (hereinafter, referred to as "depth information") can be obtained using a multiple-baseline stereo approach (see NPL 1) on the basis of two images imaged by two cameras whose angles of view overlap on each other.

CITATION LIST

Patent Literature

[PTL 1]
JP 2014-115374A

Non Patent Literature

[NPL 1]
M. Okutomi and T. Kanade, "A Multiple-baseline Stereo," IEEE Trans. Pattern Analysis and Machine intelligence, Vol. 15, No. 4, pp. 353-363, 1993.

SUMMARY

Technical Problems

Even with an all-celestial camera capable of obtaining depth information, the case where the depth information can actually be obtained is limited to the case where the object to be imaged is present in angles of view that overlap on each other. Moreover, even in the case where the object is present in the overlapping angles of view, the depth information cannot be obtained when, for example, occlusion is generated for one of two images whose angles of view overlaps on each other resulting in hiding of the object to be imaged behind another object.

The present technique was conceived in view of the above circumstances, and enables imaging of an image that enables estimation of the depth information relating to an object to be imaged, by suppressing any generation of occlusion.

Solution to Problems

An all-celestial imaging apparatus that is an aspect of the present technique includes plural imaging parts each arranged being directed in a direction different from that of each other, and the plural imaging parts are arranged such that all imaging ranges on at least one circumference of imaging ranges by the plural imaging parts are each overlapped by angles of view of two or more pairs of the imaging part.

The all-celestial imaging apparatus can be adapted for the plural imaging parts to be arranged such that an imaging range exceeding a shortest imaging distance of each of the imaging parts is overlapped by the angles of view of two or more pairs of the imaging parts.

The all-celestial imaging apparatus can be adapted for the plural imaging parts to be arranged such that all directions of 360° of a sphere centering the all-celestial imaging apparatus are each overlapped by angles of view of two or more pairs of the imaging parts.

The all-celestial imaging apparatus can be adapted for the plural imaging parts to be arranged such that ail directions of 360° excluding a portion of a sphere centering the all-celestial imaging apparatus are each overlapped by angles of view of two or more pairs of the imaging parts.

The all-celestial imaging apparatus can be adapted for the plural imaging parts to be arranged such that all directions of 360° excluding at least one of a top portion or a bottom portion of a sphere centering the all-celestial imaging apparatus are each overlapped by angles of view of two or more pairs of the imaging parts.

The all-celestial imaging apparatus can be adapted for the plural imaging parts to be arranged being stacked on each other in at least two or more tiers such that all the imaging ranges on at least one circumference of the imaging ranges by the plural imaging parts are each overlapped by angles of view of two or more pairs of the imaging parts.

The all-celestial imaging apparatus can be adapted for the plural imaging parts to be arranged such that an angle β of view of the imaging part, an arrangement radius r from a center of the all-celestial imaging apparatus to the imaging parts, a shortest distance t enabling calculation of depth information that indicates a distance to an object to be imaged, and a deemed angle θ of view of the imaging part, seen from the center of the all-celestial imaging apparatus satisfy a relational equation (2).

[Math. 2]

$$\frac{(r+t)\sin\frac{\theta}{2}}{\sin\frac{\beta}{2}}\cos\frac{\beta}{2} + 2(r+t)\sin\frac{\theta}{4}\cos\left(\frac{\pi}{2}-\frac{\theta}{4}\right) = t \quad (2)$$

$$\frac{(r+t)\sin\frac{\theta}{2}}{\tan\frac{\beta}{2}} + 2(r+t)\sin\frac{\theta}{4}\sin\frac{\theta}{4} = t$$

$$\frac{(r+t)2\tan\frac{\theta}{4}}{\tan\frac{\beta}{2}1+\tan^2\frac{\theta}{4}} + (r+t)\left(1-\cos\frac{\theta}{2}\right) = t$$

-continued $$2\frac{(r+t)}{\tan\frac{\beta}{2}}\tan\frac{\theta}{4} - (r+t)\left(1 - \tan^2\frac{\theta}{4}\right) + r\left(1 + \tan^2\frac{\theta}{4}\right) = 0$$

$$(2r+t)\tan^2\frac{\theta}{4} + 2\frac{(r+t)}{\tan\frac{\beta}{2}}\tan\frac{\theta}{4} - t = 0$$

$$\tan\frac{\theta}{4} = \frac{-(r+t) \pm \sqrt{(r+t)^2 + t(2r+t)\tan^2\frac{\beta}{2}}}{(2r+t)\tan\frac{\beta}{2}}$$

The images imaged by a pair of the imaging parts whose angles of view overlap on each other are used for calculation of depth information that indicates a distance to an object to be imaged.

In an aspect of the present technique, the all-celestial imaging apparatus can image such that all the imaging ranges on at least one circumference of the imaging ranges are each overlapped by angles of view of two or more pairs of the imaging parts.

Advantageous Effect of Invention

According to an aspect of the present technique, any generation of the occlusion can be suppressed and images enabling estimation of depth information of the object can be imaged.

BRIEF DESCRIPTION OF DRAWINGS

FIG. 6 is a diagram depicting an ideal number of the arranged cameras corresponding to the cameras in FIG.

DESCRIPTION OF EMBODIMENT

The best mode to implement the present technique (hereinafter, referred to as "the present embodiment") will be described below in detail with reference to the drawings.
<About All-Celestial Imaging Apparatus to be the Present Embodiment>

An all-celestial imaging apparatus to be the present embodiment includes plural cameras that are arranged each being directed in a direction different from that of each other and whose angles of view have a common size, and the plural cameras are arranged such that two or more pairs of cameras each having a picture frame overlapping on that of each other are present to suppress any generation of occlusion in all the directions of 360° centering the all-celestial imaging apparatus. Any generation of occlusion can thereby be suppressed, and estimation is enabled for depth information relating to objects to be imaged that may be present in all the directions of 360°.

Hereinafter, all the directions of 360° centering the all-celestial imaging apparatus will be deemed as a sphere and positional information for the lateral direction will be referred to as "longitude" and positional information for the longitudinal direction will be referred to as "latitude."

Figure 1:
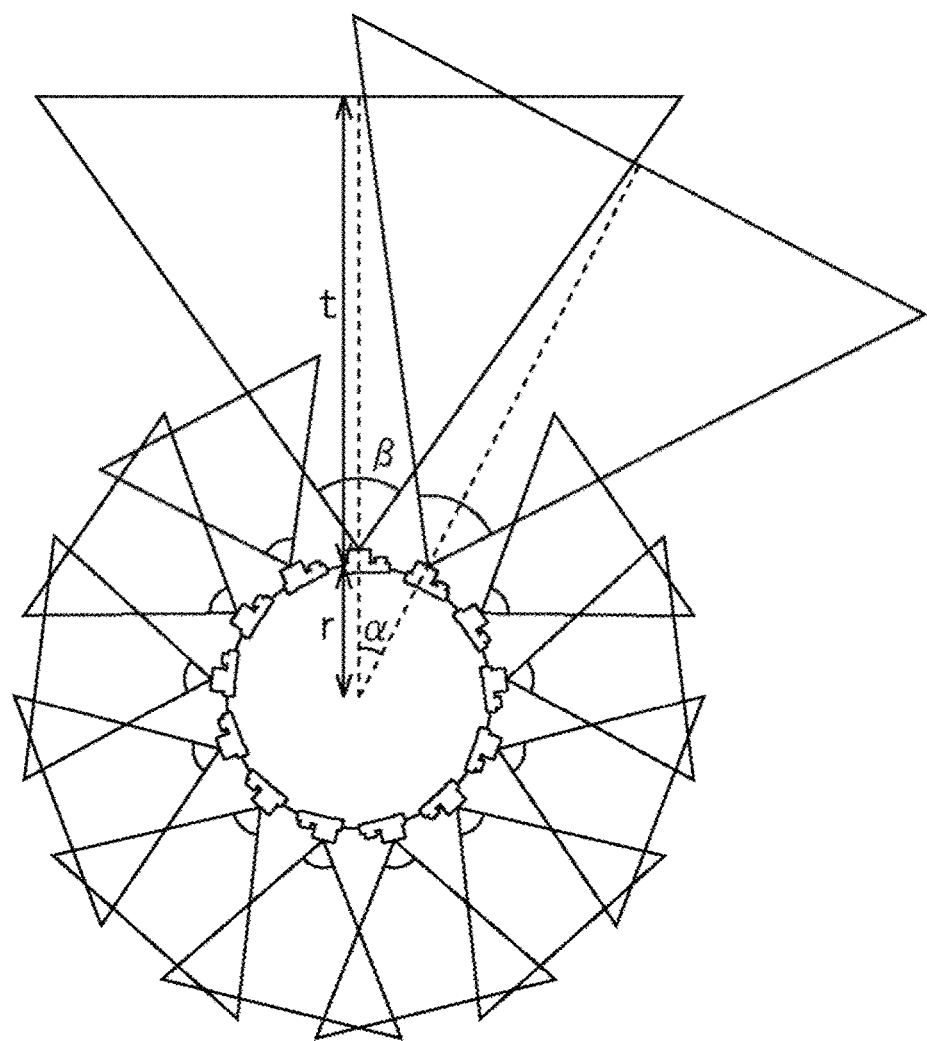
FIG. 1 is a diagram depicting arrangement angles, angles of view, and overlapping of the angles of view obtained in the case where plural cameras constituting an all-celestial imaging apparatus are uniformly arranged on a circumference in a lateral plane.

FIG. 1 is a diagram depicting arrangement angles, angles of view, and overlapping of the angles of view that are obtained in the case where the plural cameras constituting the all-celestial imaging apparatus are uniformly arranged in a lateral plane at an equal latitude to have a circumferential shape.

As depicted in FIG. 1, two cameras adjacent to each other (a camera pair) are noted that are present in the case where the plural cameras constituting the all-celestial imaging apparatus are uniformly arranged in the lateral plane at the equal latitude to have the circumferential shape each at an arrangement angle α. When overlapping of the angles of view of the two cameras on each other exceeds 50% at a position at a distance t from each of the two cameras, 50% or more of each of the angles of view always overlaps on each other at a position at the distance t or more therefrom. Furthermore, handling all the cameras constituting the all-celestial imaging apparatus as pairs each including two cameras, the overall circumference of 360° in the lateral plane is always placed within the angles of view of two or more cameras.

Figure 2:
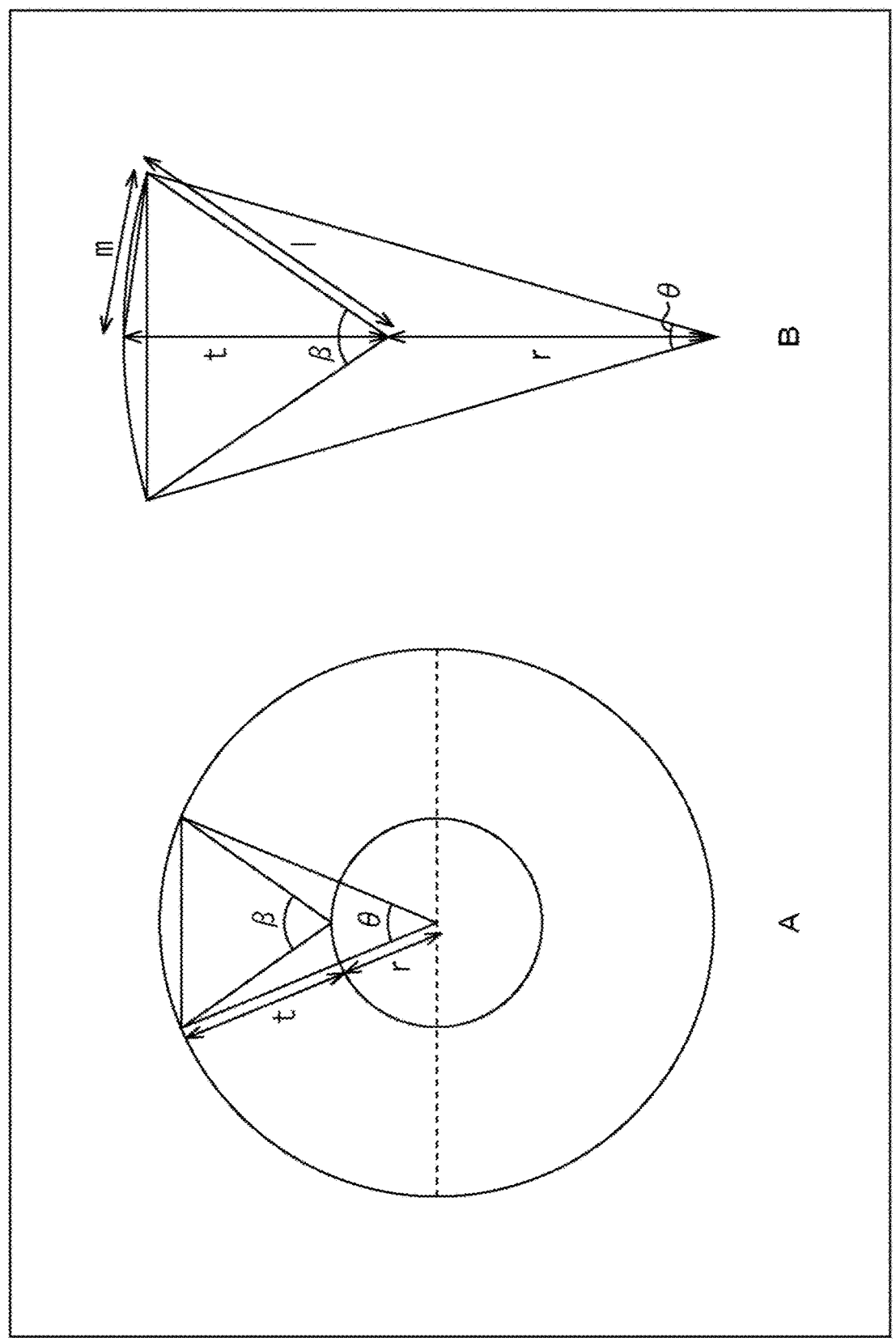
FIG. 2 illustrates diagrams depicting a relation between the angle of view of each of the cameras constituting the ail-celestial imaging apparatus and a deemed angle of view from the center of the all-celestial imaging apparatus.

Next, FIG. 2 illustrates diagrams depicting the relation between an angle β of view of each of the plural cameras constituting the all-celestial imaging apparatus, and a deemed angle θ of view from the center of the all-celestial imaging apparatus, that are obtained in the case where the plural cameras are arranged as depicted in FIG. 1.

As depicted in A of FIG. 2, in the case where the plural cameras constituting the all-celestial imaging apparatus are arranged in a lateral plane at the equal latitude to have a circumferential shape, the angle θ of views of each of the cameras seen from the center of the all-celestial imaging apparatus is smaller than the angle β of view of the actual camera. Concerning this, in the case where a radius of the circumference on which the cameras are arranged is represented by "r" and distances "l" and "m" are defined as depicted in B of FIG. 2, the relation is as represented by the following equation (1) between the actual angle β of view of the camera and a deemed angle θ of view seen from the center of the ail-celestial imaging apparatus at the distance t from the camera.

[Math. 1]

$$(r+t)\sin\frac{\theta}{2} = \left|\sin\frac{\beta}{2}\right|, m = 2(r+t)\sin\frac{\theta}{4}, \left|\cos\frac{\beta}{2} + m\cos\left(\frac{\pi}{2} - \frac{\theta}{4}\right)\right| = t \quad (1)$$

A relational equation (2) presented below is derived from equation (1).

[Math. 2]

$$\frac{(r+t)\sin\frac{\theta}{2}}{\sin\frac{\beta}{2}}\cos\frac{\beta}{2} + 2(r+t)\sin\frac{\theta}{4}\cos\left(\frac{\pi}{2} - \frac{\theta}{4}\right) = t \quad (2)$$

$$\frac{(r+t)\sin\frac{\theta}{2}}{\tan\frac{\beta}{2}} + 2(r+t)\sin\frac{\theta}{4}\sin\frac{\theta}{4} = t$$

$$\frac{(r+t)2\tan\frac{\theta}{4}}{\tan\frac{\beta}{2}1+\tan^2\frac{\theta}{4}} + (r+t)\left(1-\cos\frac{\theta}{2}\right) = t$$

-continued $$2\frac{(r+t)}{\tan\frac{\beta}{2}}\tan\frac{\theta}{4} - (r+t)\left(1-\tan^2\frac{\theta}{4}\right) + r\left(1+\tan^2\frac{\theta}{4}\right) = 0$$

$$(2r+t)\tan^2\frac{\theta}{4} + 2\frac{(r+t)}{\tan\frac{\beta}{2}}\tan\frac{\theta}{4} - t = 0$$

$$\tan\frac{\theta}{4} = \frac{-(r+t) \pm \sqrt{(r+t)^2 + t(2r+t)\tan^2\frac{\beta}{2}}}{(2r+t)\tan\frac{\beta}{2}}$$

Setting the angle β of view of each of the cameras constituting the all-celestial imaging apparatus, the arrangement radius r of each of the cameras, and the shortest distance t from the camera to an object to be imaged whose depth information is desired to be estimated, the deemed angle θ of view per each one of the cameras is therefore calculated on the basis of the relational equation (2). Furthermore, the number of the cameras and the arrangement angle α only have to be determined that are necessary for covering the overall circumference of 360° in the lateral plane on the basis of the deemed angle θ of view.

In addition, shortest distance t from the camera to the object whose depth information is desired to be estimated only has to be set to be equal to or larger than the shortest imaging distance of each of the cameras constituting the all-celestial imaging apparatus in accordance with the use of the all-celestial imaging apparatus. Concerning this, the "shortest imaging distance of the camera" is defined to be (the distance to the focal plane—the forward depth of field) obtained in the state where the focal distances and the aperture values of all the cameras constituting the all-celestial imaging apparatus are each unified to be a predetermined value.

Figure 3:
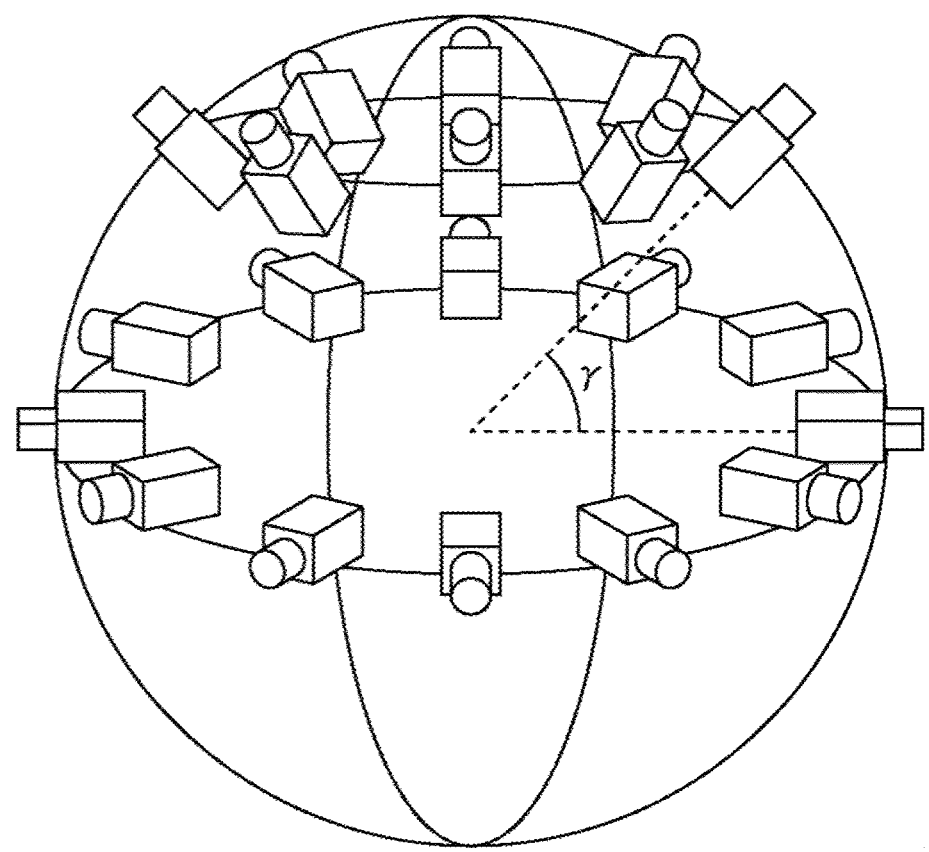
FIG. 3 is a diagram depicting an example of the arrangement obtained in the case where the plural cameras constituting the all-celestial imaging apparatus are uniformly arranged on a circumference in a longitudinal plane.
Figure 4:
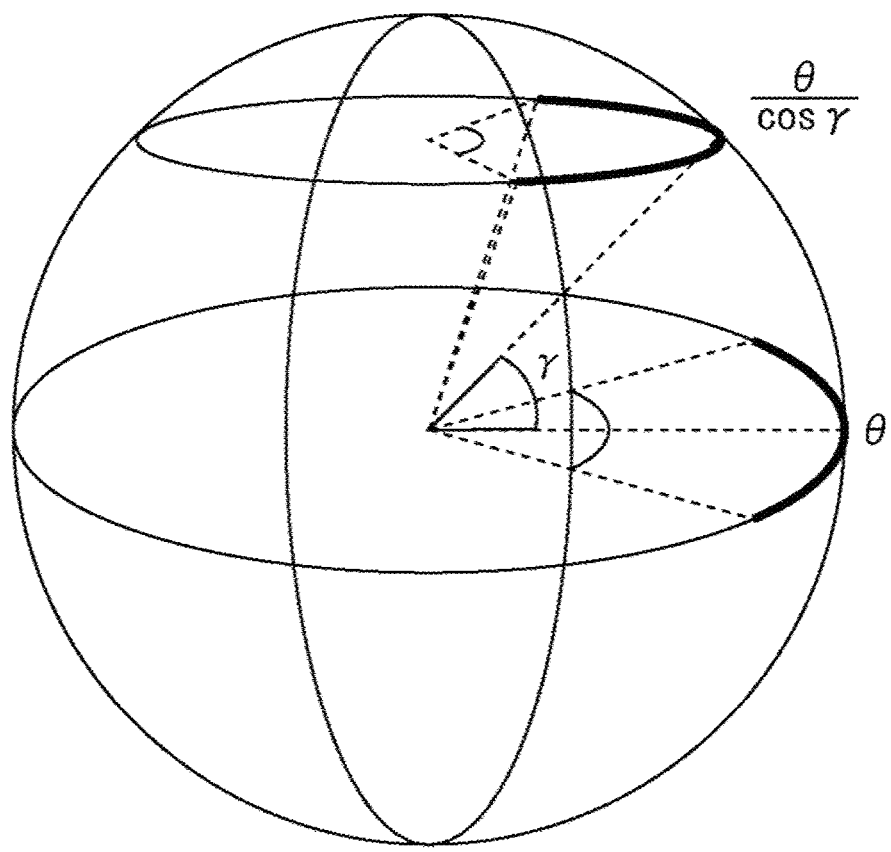
FIG. 4 is a diagram depicting a relation between as arrangement latitude and the deemed angle of view obtained in the case where the plural cameras constituting the all-celestial imaging apparatus are uniformly arranged on a circumference in a longitudinal plane.

Next, FIG. 3 depicts an example of the arrangement obtained when the plural cameras constituting the all-celestial imaging apparatus are uniformly arranged in a longitudinal plane at the same one longitude to have a circumferential shape, and FIG. 4 depicts the relation between an arrangement latitude γ of the cameras and the deemed angle θ of view from the center of the all-celestial imaging apparatus.

As depicted in FIG. 3, in the case where the cameras are arranged being directed in the imaging directions in accordance with the latitude, the deemed angle of view of each of the cameras becomes wider associated with an increase of the arrangement latitude of the camera. It is therefore possible to reduce the number of the cameras arranged at the latitude γ as the arrangement latitude becomes larger. More specifically, representing the deemed angle of view at the latitude of 0° as "θ," the deemed angle of view of the camera at the arrangement latitude γ is θ/cos γ.

When the number of the arranged cameras and the arrangement latitude γ are determined based on the above result such that the overlapping of the deemed angles θ/cos γ of view in the latitude direction is 50% or more for each of the adjacent cameras uniformly arranged in a longitudinal plane at the one same longitude to have a circumferential shape, the overall circumference of 360° is always placed within the angles of view of two or more cameras.

Taking into consideration the arrangement of the cameras in the lateral plane and the arrangement of the cameras in the longitudinal plane described above, ail the directions of 360° can always be imaged by two or more pairs of the cameras, of the camera pairs adjacent to each other in the lateral direction and the camera pairs adjacent to each other in the longitudinal direction. Highly precise estimation is enabled for the depth information of the object to be imaged that may be present in all the directions of 360°.

<Specific Examples of All-Celestial Imaging Apparatus to be the Present Embodiment>

A specific examples of the all-celestial imaging apparatus to be the present embodiment will be described next.

First Specific Example

Figure 5:
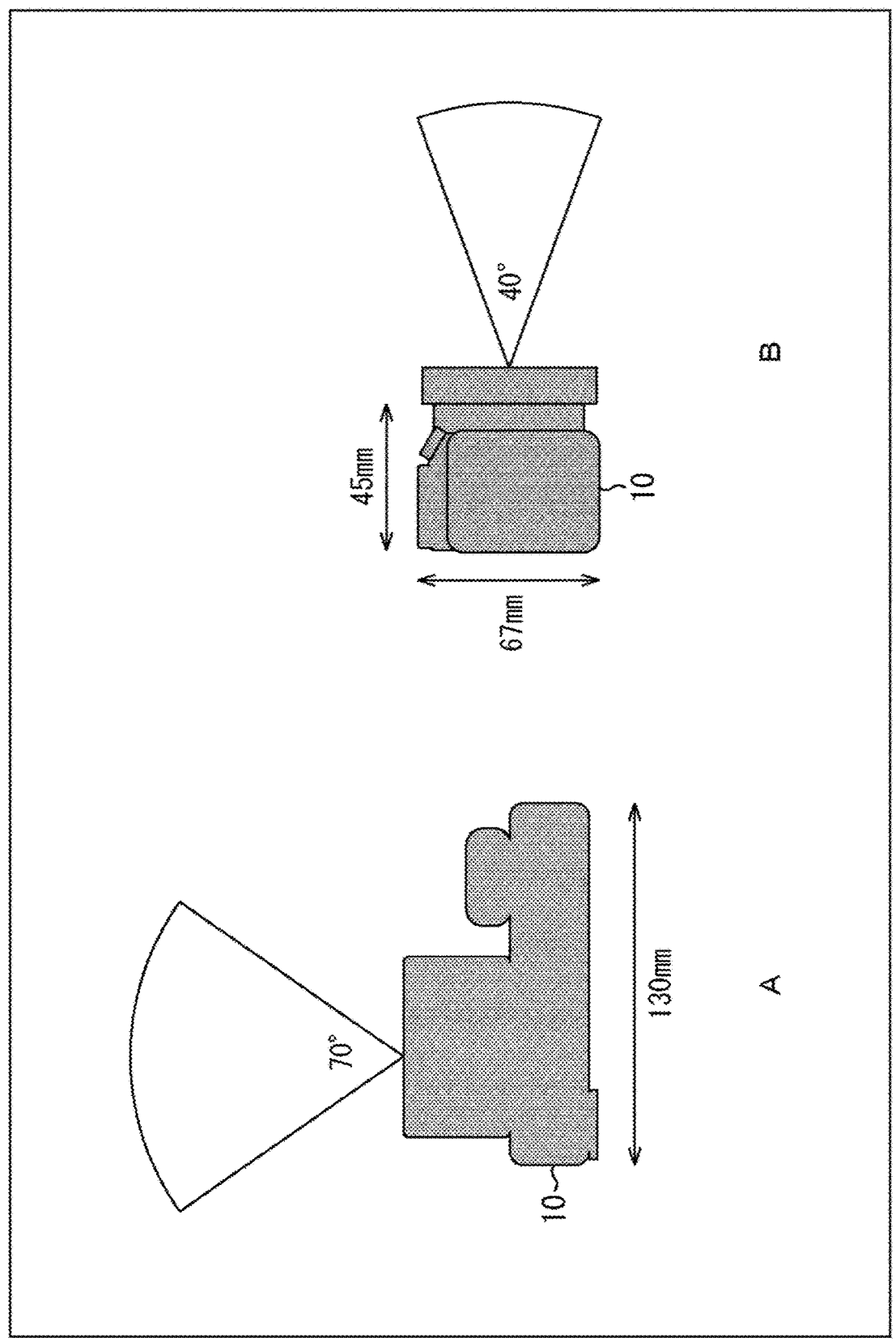
FIG. 5 illustrates diagrams depicting an example of a horizontal and a vertical angles of view, and a housing size of each of mirrorless single-lens cameras constituting the all-celestial imaging apparatus.

FIG. 5 illustrates an example of a horizontal angle β of view, a vertical angle λ of view, a housing size, and the like of an ordinary mirrorless single-lens camera 10 that images an image whose aspect ratio is 16:9 in the case where this camera is employed as each of the cameras constituting the all-celestial imaging apparatus to be the present embodiment.

In the example in FIG. 5, the horizontal angle of view of the mirrorless single-lens camera 10 is 70°, the vertical angle of view thereof is 40°, and the housing thereof has a lateral width of 130 mm, a longitudinal width of 67 mm, and a depth of 45 mm.

FIG. 6 depicts an ideal number of the mirrorless single-lens cameras 10 installed at each of the arrangement latitudes in the case where the shortest distance t is set to be 1.5 m taking into consideration only the horizontal angle of view and the vertical angle of view of the mirrorless single-lens camera 10.

The housing size, the various types of cable space, and the like however need to be taken into consideration in the case where the mirrorless single-lens cameras 10 are actually arranged and, in the case where these items are taken into consideration, the number of the mirrorless single-lens cameras 10 is increased to an approximately 1.5-fold value of the value necessary is the case in FIG. 6 and approximately 100 mirrorless single-lens cameras 10 are necessary.

Figure 7:
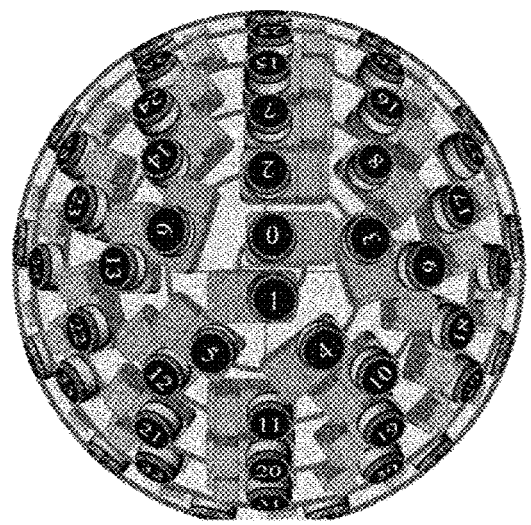
FIG. 7 is a three-dimensional diagram obtained in the case where the cameras in FIG. 5 constitute the all-celestial imaging apparatus.

FIG. 7 is a three-dimensional diagram depicting the entirety obtained by constituting the all-celestial imaging apparatus by arranging the 100 mirrorless single-lens cameras 10 taking into consideration the housing size, the various types of cable space, and the like.

Figure 8:
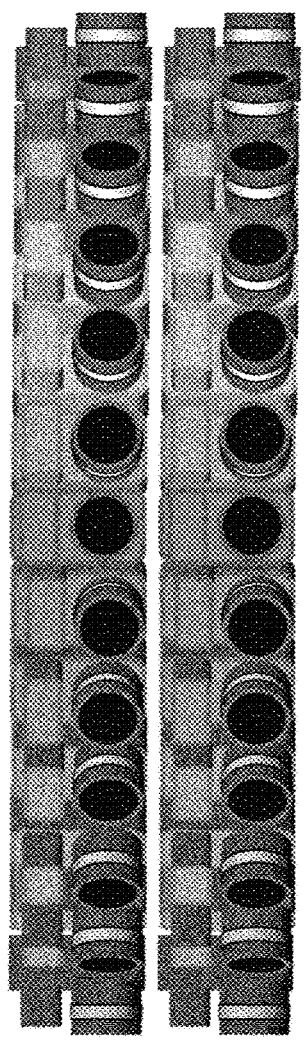
FIG. 8 is a three-dimensional diagram of two rows in the longitudinal direction corresponding to FIG. 7.
Figure 9:
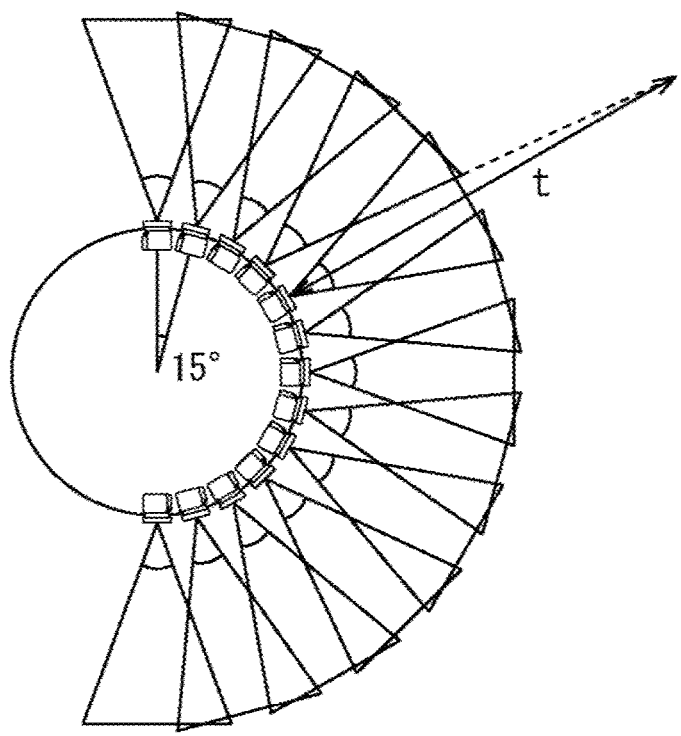
FIG. 9 is a diagram depicting the arrangement angle in the longitudinal direction (the latitude direction) corresponding to FIG. 7.

FIG. 8 is a three-dimensional diagram for two rows in the longitudinal direction of the all-celestial imaging apparatus depicted in FIG. 7. FIG. 9 depicts the arrangement angle in the longitudinal direction. (the latitude direction) corresponding to FIG. 7. In this case, the arrangement angle between the two mirrorless single-lens cameras 10 adjacent to each other in the longitudinal direction is approximately 15°.

Figure 10:
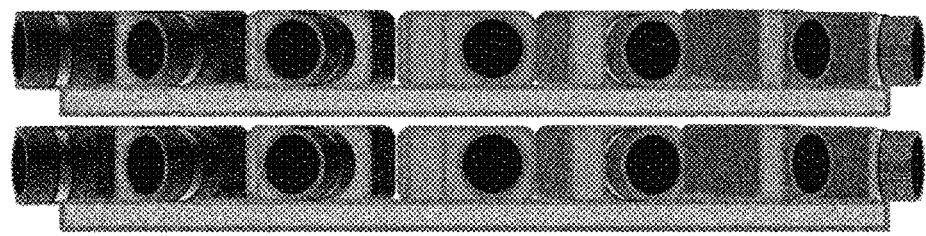
FIG. 10 is a three-dimensional diagram of two rows in the lateral direction corresponding to FIG. 7.
Figure 11:
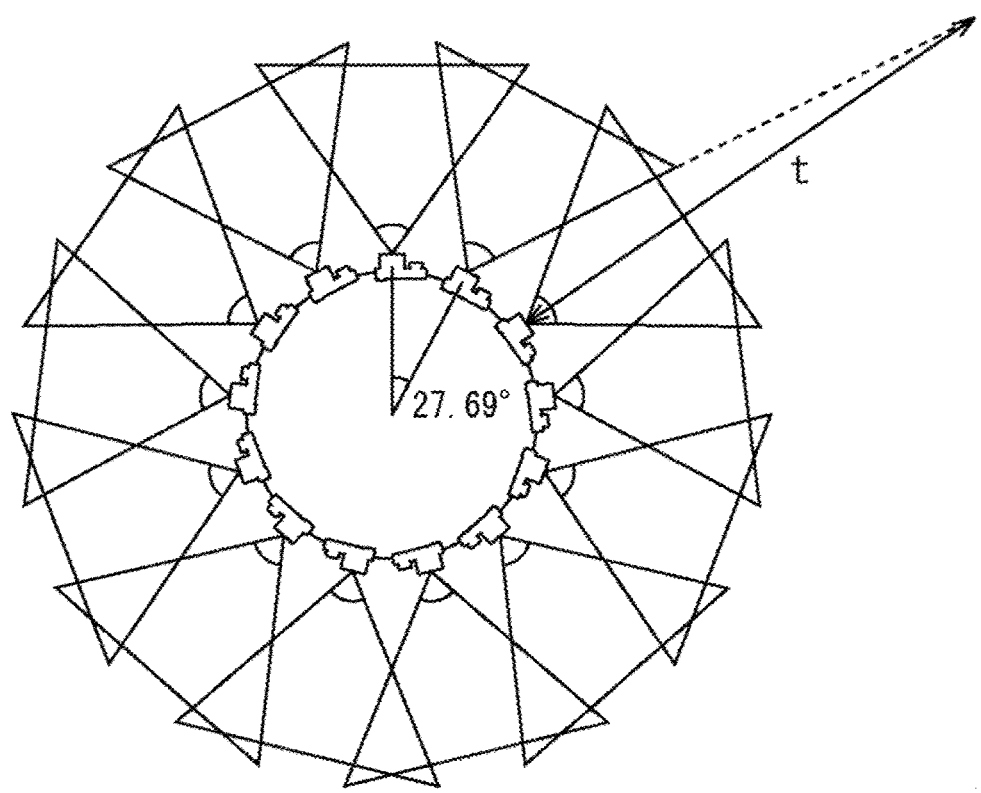
FIG. 11 is a diagram depicting the arrangement angle in the lateral direction. (the longitudinal direction) corresponding to FIG. 7.

FIG. 10 is a three-dimensional diagram for two rows in the lateral direction of the all-celestial imaging apparatus depicted in FIG. 7. FIG. 11 depicts the arrangement angle in the lateral direction (the longitude direction) corresponding to FIG. 7. In this case, the arrangement angle between the two mirrorless single-lens cameras 10 adjacent to each other in the lateral direction is approximately 28°.

Figure 12:
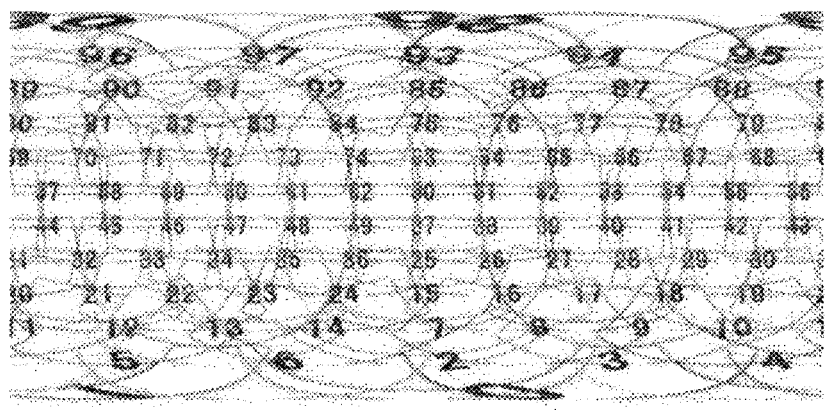
FIG. 12 is as equidistant cylindrical diagram of the angles of view of all the cameras constituting the all-celestial imaging apparatus in FIG. 7.

FIG. 12 is a diagram depicting a projection of the angles of view of all the mirrorless single-lens cameras 10 constituting the all-celestial imaging apparatus depicted in FIG. 7 onto a two-dimensional plane using equidistant cylindrical projection. In addition, the numbers from one to 100 placed at the centers of the angles of view in FIG. 12 each indicate the corresponding camera.

Figure 13:
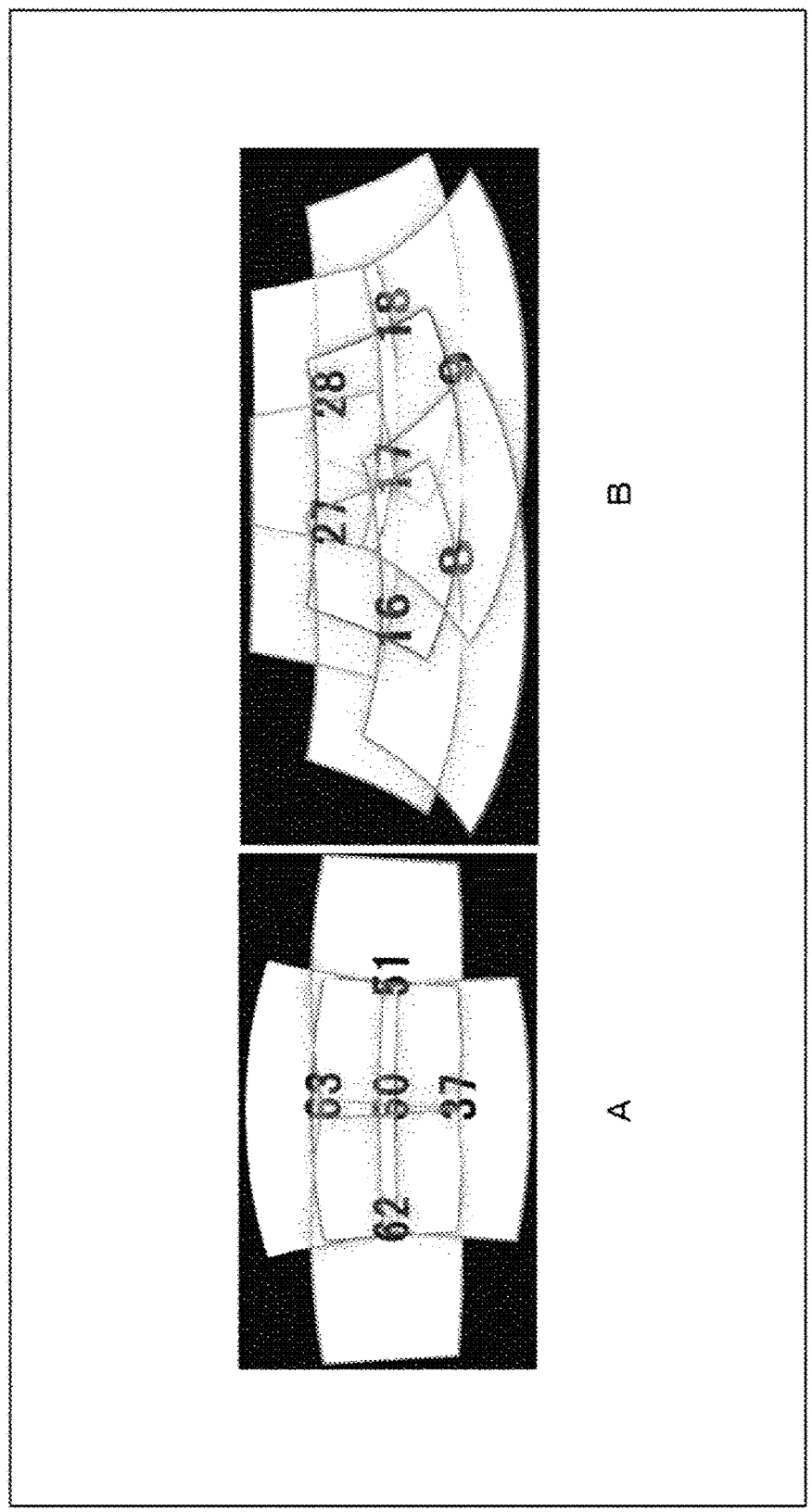
FIG. 13 illustrates equidistant cylindrical diagrams of the angles of view of some of the cameras constituting the ail-celestial imaging apparatus in FIG.

FIG. 13 illustrates diagrams each depicting a projection of the angles of view of some of the mirrorless single-lens cameras 10 constituting the all-celestial imaging apparatus depicted in FIG. 7 onto a two-dimensional plane using the equidistant cylindrical projection. A of FIG. 13 depicts the angles of view for five cameras and B of FIG. 13 depicts the angles of view for seven cameras.

As is clear from FIG. 12 and FIG. 13, it can be seen that angles of view of two or more pairs of cameras overlap on each other in any area of the equidistant cylindrical diagram, that is, in any direction of all the directions of 360° of the all-celestial imaging apparatus. Even when occlusion is generated for an object to be imaged whose depth information is desired to be obtained, in images obtained from one certain camera pair, it can therefore be expected that no occlusion is generated for this object in images obtained from another camera pair. The all-celestial imaging apparatus can therefore suppress any generation of occlusion of any object to be imaged, and can therefore image images from which the depth information of an object to be imaged can be obtained only when the object is present at a position at a distance equal to or larger than t in any direction of all the directions of 360°. Furthermore, when the depth information is estimated on the basis of the images of two or more pairs of the cameras, the depth information can highly precisely be estimated compared to the case where the depth information is estimated on the basis of the images of one pair of the cameras. The all-celestial imaging apparatus is therefore enabled to image images from which the depth information can highly precisely be estimated compared to the conventional case.

Second Specific Example

Figure 14:
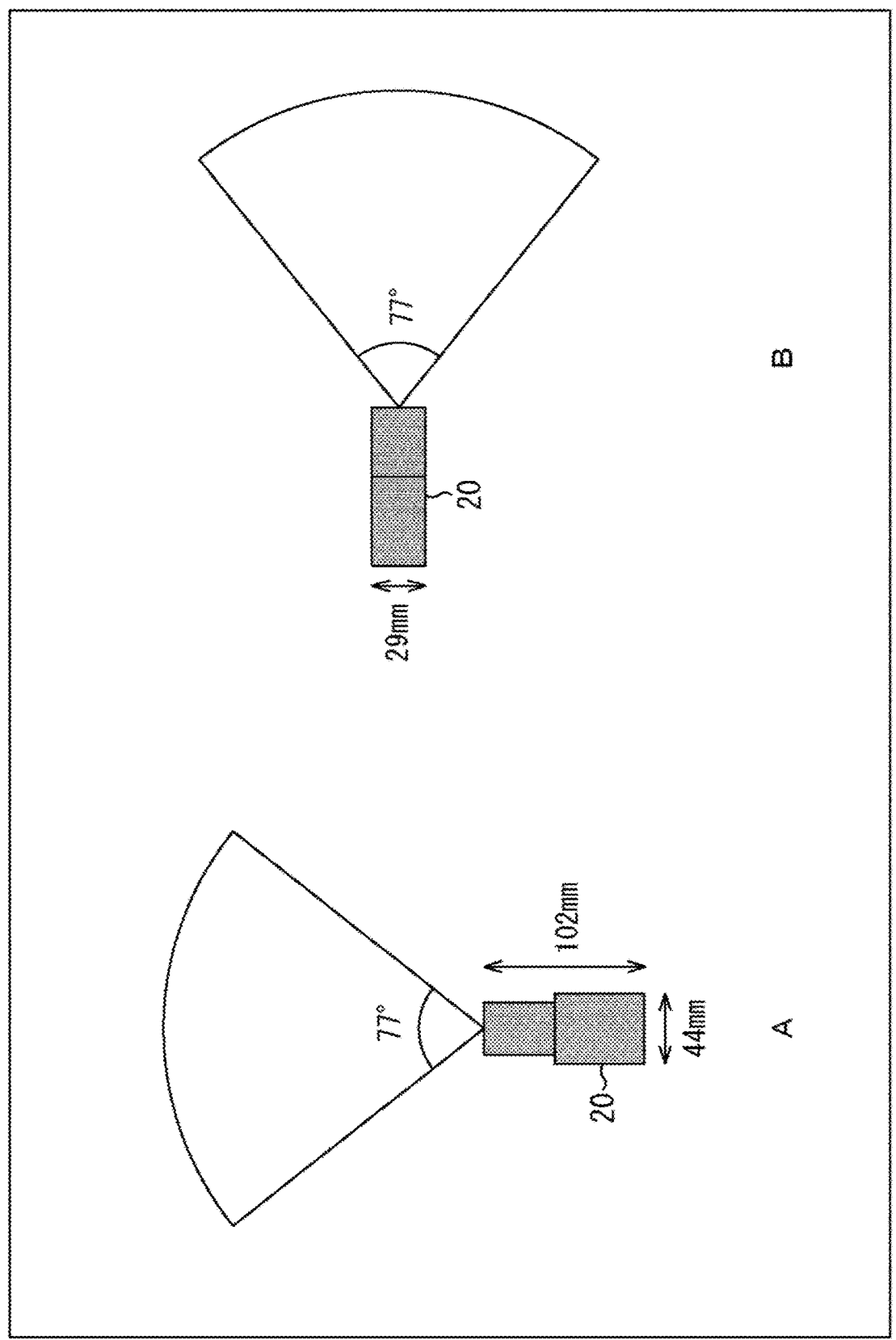
FIG. 14 illustrates diagrams depicting an example of the horizontal and the vertical angles of view, and the housing size of a dimetric camera constituting the all-celestial imaging apparatus.

Next, FIG. 14 illustrates an example of a horizontal angle β of view, a vertical angle λ of view, a housing size, and the like of a dimetric camera 20 in the case where the dimetric camera 20 that images an image having a dimetric aspect ratio (1:1) is employed as each of the cameras constituting the all-celestial imaging apparatus to be the present embodiment.

In the example of FIG. 14, the horizontal angle of view and the vertical angle of view of the dimetric camera 20 are each 77°, and the housing thereof has a lateral width of 44 mm, a longitudinal width of 29 mm, and a depth of 102 mm.

For the dimetric camera 20, when the horizontal angle of view, the vertical angle of view, the housing size, the various types of cable space, and the like are taken into consideration, approximately 54 cameras can constitute the all-celestial imaging apparatus. It can therefore be seen that the all-celestial imaging apparatus can be constituted by a few cameras compared to the case where the above mirrorless single-lens cameras 10 are used.

Figure 15:
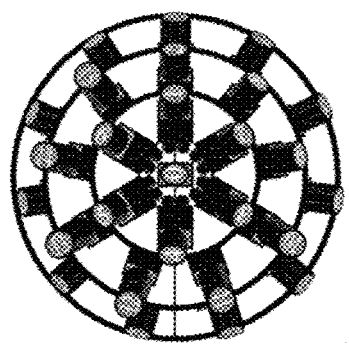
FIG. 15 is a three-dimensional diagram obtained in the case where the cameras in FIG. 14 constitute the all-celestial imaging apparatus.

FIG. 15 is a three-dimensional diagram depicting the entirety obtained in the case where the 54 dimetric cameras 20 constitute the all-celestial imaging apparatus taking into consideration the realistic arrangement.

Figure 16:
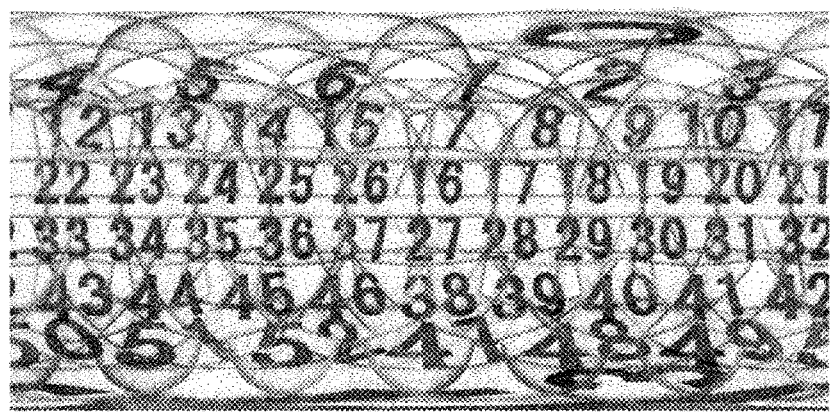
FIG. 16 is an equidistant cylindrical diagram of the angles of view of all the cameras constituting the all-celestial imaging apparatus in FIG. 15.

FIG. 16 is a diagram depicting a projection of the angles of view of the 54 dimetric cameras 20 constituting the all-celestial imaging apparatus depicted in FIG. 15 onto a two-dimensional plane using the equidistant cylindrical projection. In addition, the numbers from one to 54 placed at the centers of the angles of view in FIG. 16 each indicate the corresponding camera.

Figure 17:
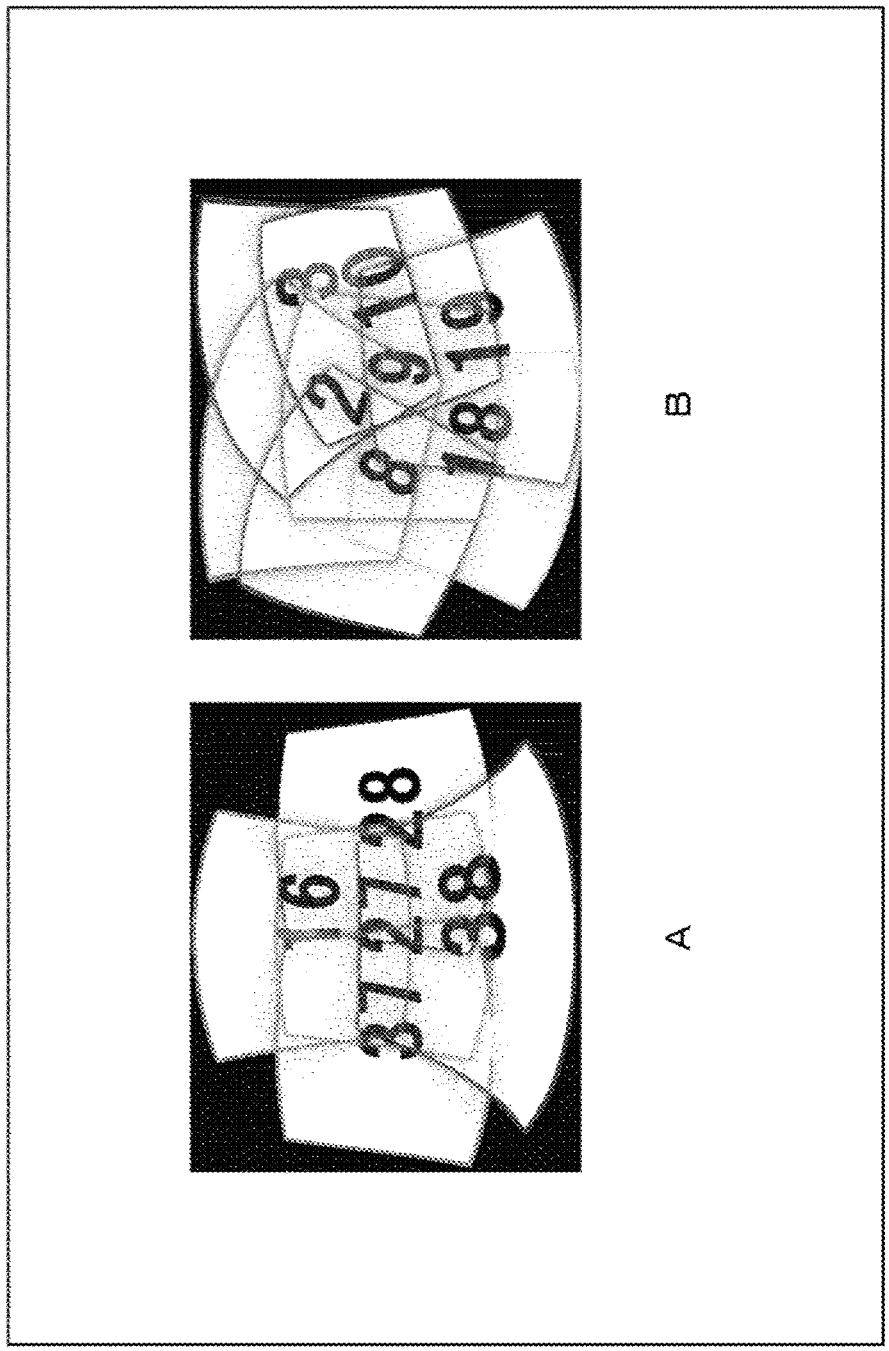
FIG. 17 illustrates equidistant cylindrical diagrams of the angles of view of some of the cameras constituting the all-celestial imaging apparatus in FIG. 15.

FIG. 17 illustrates diagrams each depicting a projection of the angles of view of some of the dimetric cameras 20 constituting the all-celestial imaging apparatus depicted in FIG. 15 onto a two-dimensional plane using the equidistant cylindrical projection. A of FIG. 17 depicts the angles of view for five cameras and B of FIG. 17 depicts the angles of view for seven cameras.

As is clear from FIG. 16 and FIG. 17, it can be seen that angles of view of two or more pairs of the cameras overlap on each other in any area of the equidistant cylindrical diagram, that is, in any direction of all the directions of 360° of the all-celestial imaging apparatus. Even when occlusion is generated for an object to be imaged whose depth information is desired to be obtained in images obtained from one certain camera pair, it can therefore be expected that no occlusion is generated for this object in images obtained from another camera pair. The all-celestial imaging apparatus can therefore suppress any generation of occlusion of any object to be imaged, and can therefore image images from which the depth information of an object to be imaged can be obtained only when the object is present at a position at a distance equal to or larger than t in any direction of all the directions of 360°. Furthermore, the all-celestial imaging apparatus is therefore enabled to image images from which the depth information can highly precisely be estimated compared to the conventional case.

Third Specific Example

Next, the case will be described where a small camera modules that each image an ultra-wide-angle image having an aspect ratio of 16:9 is employed as each of the cameras constituting the all-celestial imaging apparatus to be the present, embodiment. In addition, it is assumed that the horizontal angle of view of the small camera module is 135°, the vertical angle of view thereof is 70°, and the housing thereof has a lateral width of 24 mm, a longitudinal width of 52 nm, and a depth of 89 mm.

For the small camera module, in the case where the horizontal angle of view, the vertical angle of view, the housing size, the various types of cable space, and the like are taken into consideration, approximately 24 small camera modules can constitute the all-celestial imaging apparatus. It can therefore be seen that the all-celestial imaging apparatus can be constituted by a few compared to the case where the above dimetric cameras 20 are used.

Figure 18:
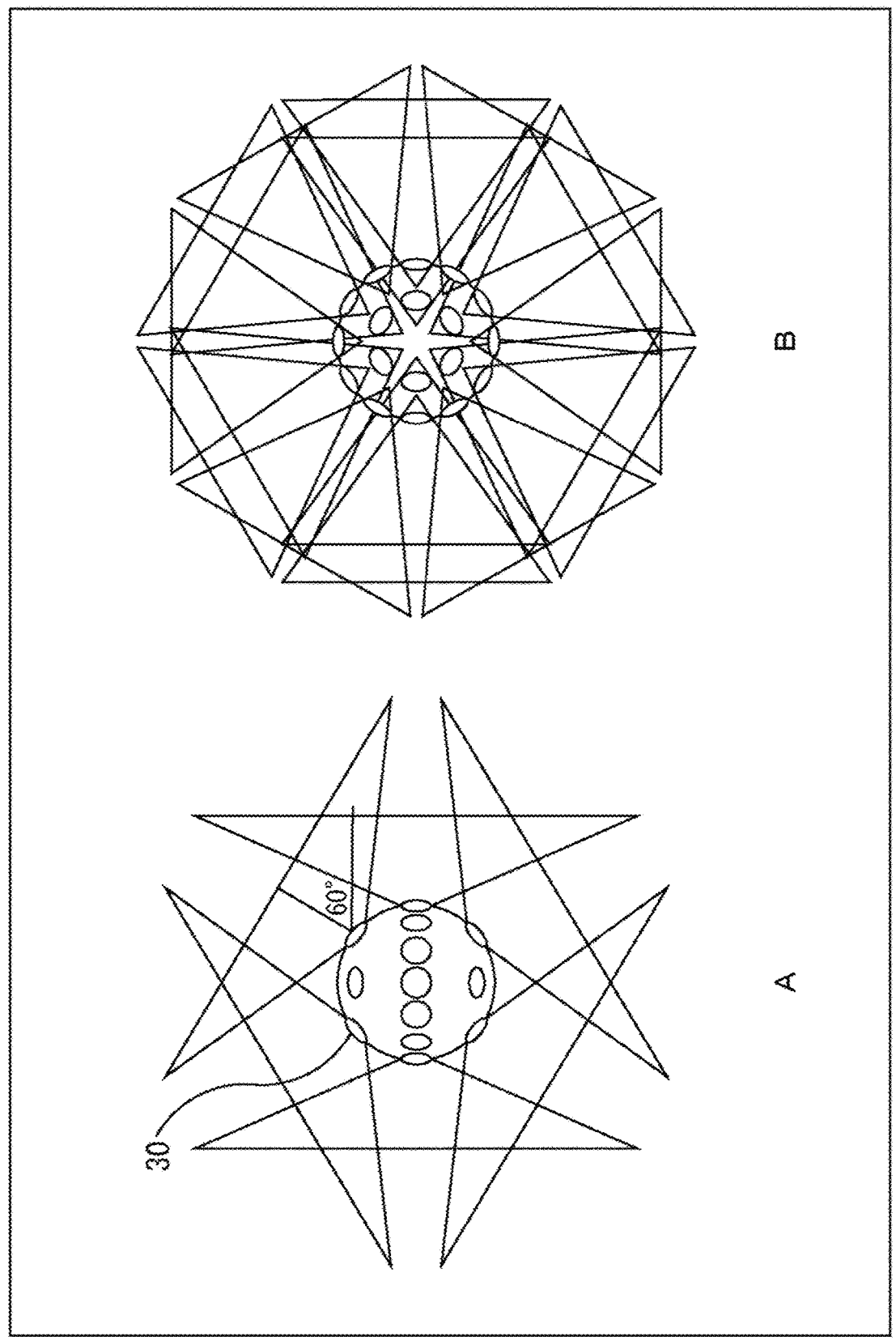
FIG. 18 illustrates three-dimensional diagrams obtained in the case where small camera modules constitute the all-celestial imaging apparatus.

FIG. 18 illustrates three-dimensional diagrams depicting the entirety obtained in the case where the all-celestial imaging apparatus is constituted by arranging the 24 small camera modules 30 taking into consideration the realistic arrangement. A. of FIG. 18 depicts the case where the entirety is seen from edge-on and B of FIG. 18 depicts the case where the entirety is seen from above.

Figure 19:
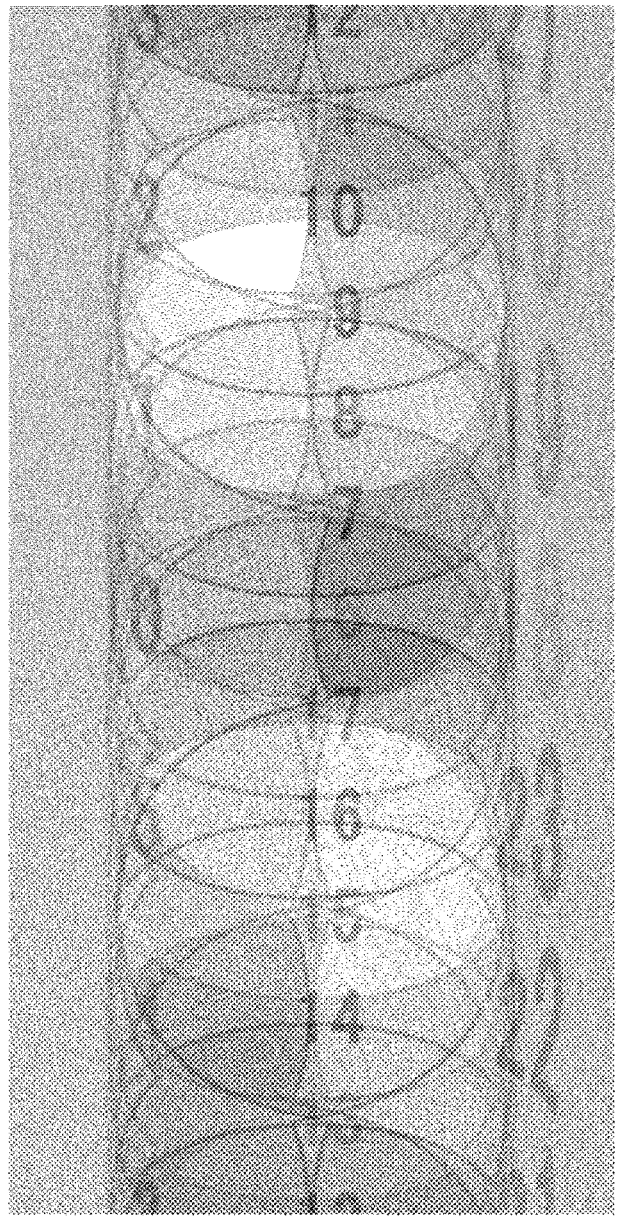
FIG. 19 is an equidistant cylindrical diagram of the angles of view of all the small camera modules constituting the all-celestial imaging apparatus in FIG. 18.

FIG. 19 is a diagram depicting a projection of the angles of view of the 24 small camera modules 30 constituting the all—celestial imaging apparatus depicted in FIG. 18 onto a two-dimensional plane using the equidistant cylindrical projection. In addition, the numbers from one to 24 placed at the centers of the angles of View FIG. 19 each indicate the corresponding camera.

As is clear from FIG. 19, it can be seen that angles of view of two or more pairs of the cameras overlap on each other in any area of the equidistant cylindrical diagram, that is, in any direction of all the directions of 360° of the all-celestial imaging apparatus. Even when occlusion is generated for an object to be imaged whose depth information is desired to be obtained in images obtained from one certain camera pair, it can therefore be expected that no occlusion is generated for this object in images obtained from another camera pair. The all-celestial imaging apparatus can therefore suppress any generation of occlusion of any object to be imaged, and can therefore image images from which the depth information of an object to be imaged can be obtained only when the object is present at a position at a distance equal to or larger than t in any direction of all the directions of 360°. Furthermore, the all-celestial imaging apparatus is enabled to image images from which the depth information can highly precisely be estimated compared to the conventional case.

Fourth Specific Example

Figure 20:
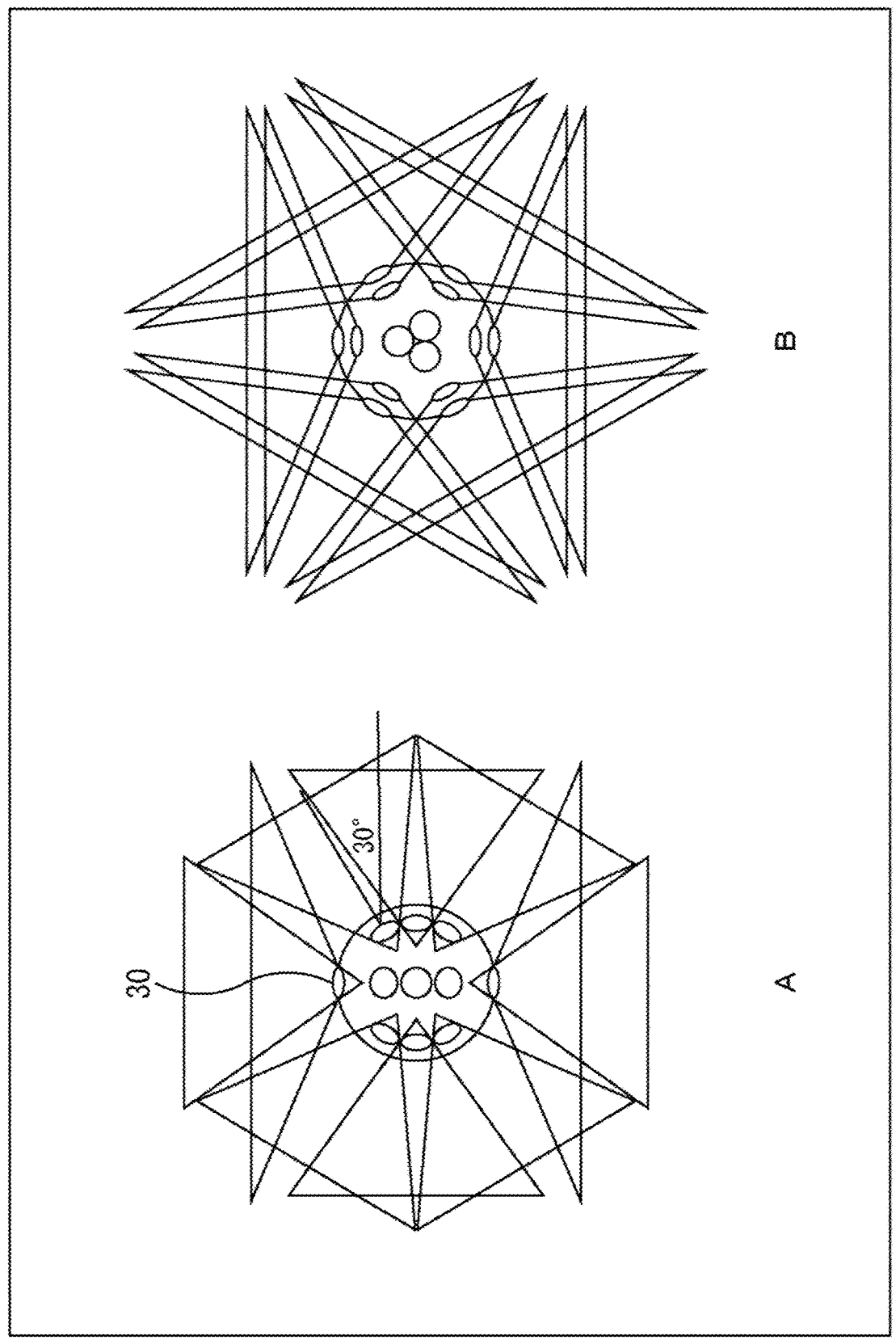
FIG. 20 illustrates three-dimensional diagrams obtained is the case where the small camera modules constitute the all-celestial imaging apparatus.

Next, FIG. 20 illustrates three-dimensional diagrams depicting the entirety obtained in the case where the all-celestial imaging apparatus is constituted by exchanging the lateral and the longitudinal directions of the small camera module 30 used in the third specific example and using these 24 small camera modules 30 taking into consideration the realistic arrangement. A of FIG. 20 depicts the case where the entirety is seen from edge-on and B of FIG. 20 depicts the case where the entirety is seen from above.

Figure 21:
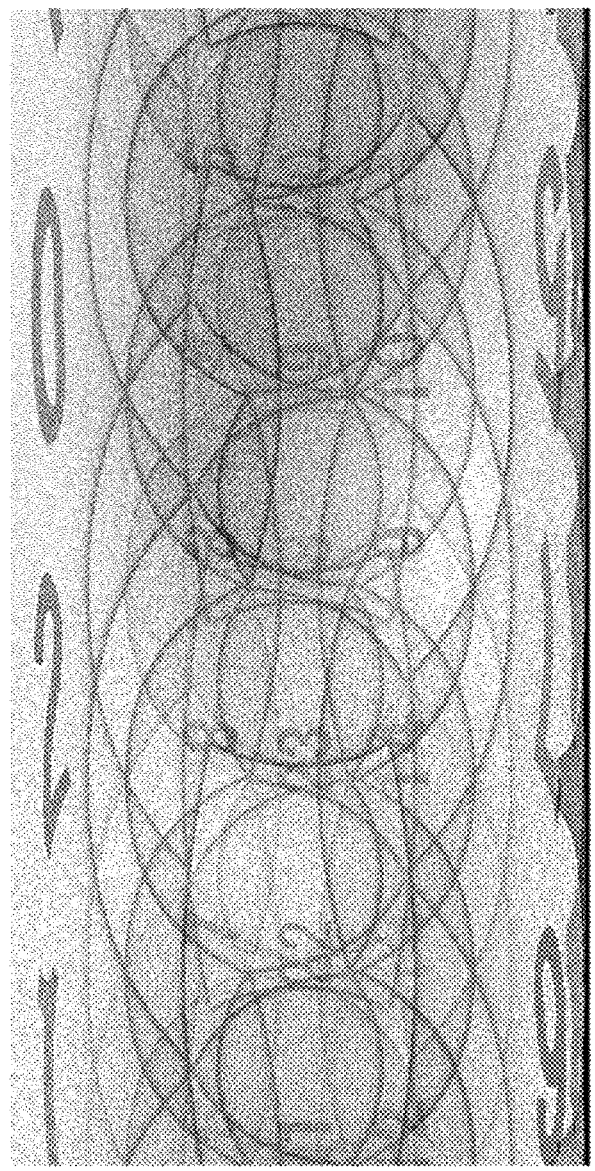
FIG. 21 is an equidistant cylindrical diagram of the angles of view of all the small camera modules constituting the all-celestial imaging apparatus in FIG. 20.

FIG. 21 is a diagram depicting a projection of the angles of view of the 24 small camera modules 30 constituting the all-celestial imaging apparatus depicted in FIG. 20 onto a two-dimensional plane using the equidistant cylindrical projection. In addition, the numbers from one to 24 placed at the centers of the angles of view in FIG. 21 each indicate the corresponding camera.

As is clear from FIG. 20, it can be seen that angles of view of two or more pairs of the cameras overlap on each other in any area of the equidistant cylindrical diagram, that is, in any direction of all the directions of 360° of the all-celestial imaging apparatus. Even when occlusion is generated for an object to be imaged whose depth information is desired to be obtained in images obtained from one certain camera pair, it can therefore be expected that no occlusion is generated for this object in images obtained from another camera pair. The all-celestial imaging apparatus can therefore suppress any generation of occlusion of any object to be imaged, and can therefore image images from which the depth information of as object to be imaged can be obtained only when the object is present at a position at a distance equal to or larger than t in any direction of all the directions of 360°. Furthermore, the all-celestial imaging apparatus is therefore enabled to image images from which the depth information can highly precisely be estimated compared to the conventional case.

First Modification Example

Relating to the above, the all-celestial imaging apparatus described above is adapted to cover objects to be imaged in all the directions of 360° while no cameras may be arranged in specific azimuth directions in which no object to be imaged can be present, in accordance with the use of the all-celestial imaging apparatus. For example, the cameras arranged in the top portion or the bottom portion of the sphere forming the all-celestial imaging apparatus may be excluded, and a microphone, leg parts to support the all-celestial imaging apparatus, and the like may be disposed at the position of this portion.

The cameras uniformly arranged in a plane to have a circumferential shape may ultimately be stacked on each other in plural tiers to constitute the all-celestial imaging apparatus.

Figure 22:
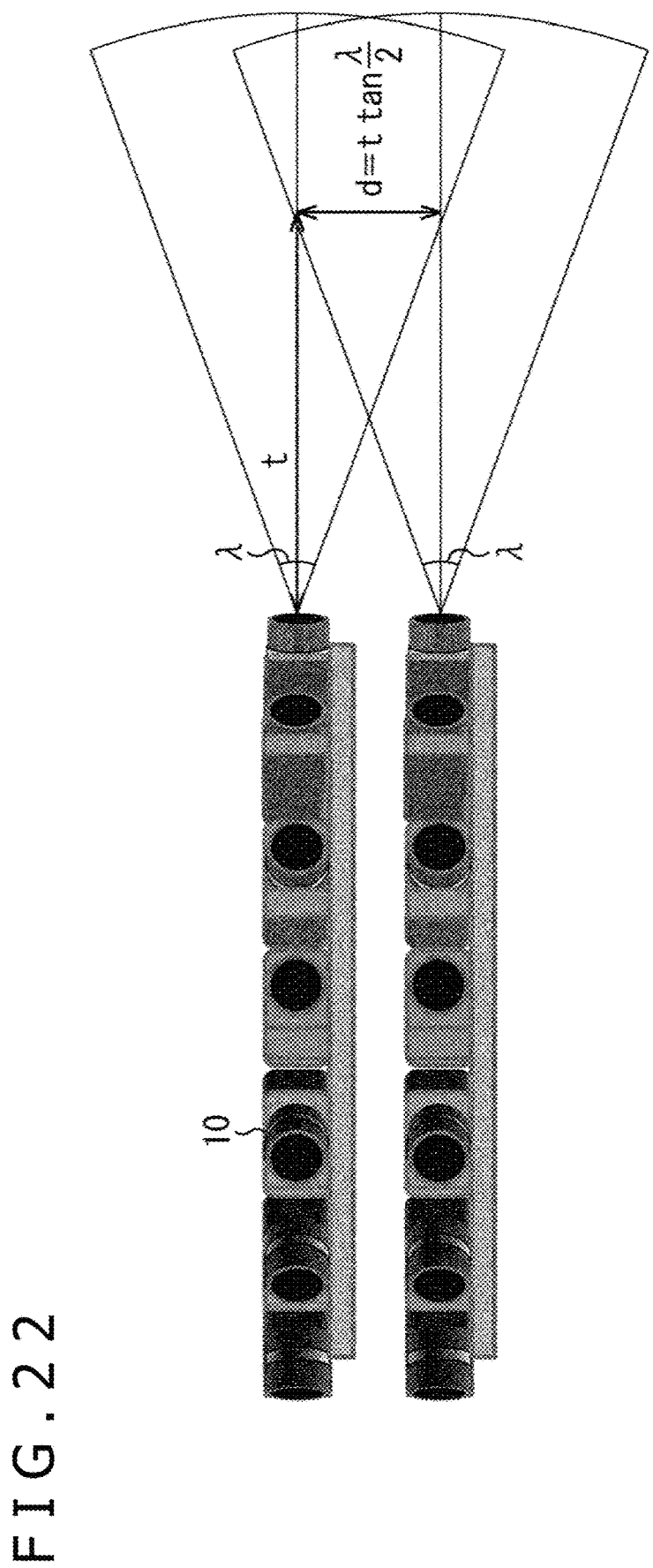
FIG. 22 is a diagram depicting as example for the case where cameras uniformly arranged in a plane to have a circumferential shape are stacked on each other in two tiers to constitute the all-celestial imaging apparatus.

FIG. 22 depicts an example for the case where the mirrorless single-lens cameras 10 uniformly arranged in a plane to have a circumferential shape are stacked on each other in two tiers to constitute the all-celestial imaging apparatus.

In this case, in the case where the vertical angle of view of each of the cameras is set to be "A" for the angles of view of the two mirrorless single-lens cameras 10 adjacent to each other in the up-and-down direction to overlap on each other by 50% or more at a distance equal to or larger than t, a distance between the two cameras only has to be set to be d=t·tan(λ/2) or smaller.

In the case in FIG. 22, precise estimation of the depth information is also enabled only when the object to be imaged present in the angle of view is present at a position at a distance equal to or larger than t.

Second Modification Example

For the all-celestial imaging apparatuses described so far, the shortest imaging distance, that is, "the distance to the focal plane—the forward depth of field" obtained in the state where the focal distances and the aperture values are each unified, is common thereto.

An all-celestial imaging apparatus may be configured using some cameras whose (the distance to the focal plane—the forward depth of field) is alone unified, to be mixed in the cameras constituting the all-celestial imaging apparatus without unifying the focal distances and the aperture values of the cameras constituting the all-celestial imaging apparatus, as a second modification example.

More specifically, for example, an all-celestial imaging apparatus may be configured using some cameras each having any one of a fish-eye lens, a wide—angle lens, a normal lens, a telescopic lens, and the like attached thereto, to be mixed in the constituent cameras, to be able to cover the all-celestial sphere improving the calculation precision of the depth information by imaging a noted area with high image quality by arranging the cameras such that (the distance to the focal plane—the forward depth of field) of each of the cameras becomes the one same value.

It is to be noted that embodiments of the present technique are not limited to the above embodiment, and various changes can be made thereto within the scope not departing from the gist of the present technique.

The present technique can also take the following configurations.

(1)

An all-celestial imaging apparatus including:

plural imaging parts each arranged being directed in a direction different from that of each other, in which the plural imaging parts are arranged such that all imaging ranges on at least one circumference of imaging ranges by the plural imaging parts are each overlapped by angles of view of two or more pairs of the imaging parts.

(2)

The all-celestial imaging apparatus described in the above (1), in which the plural imaging parts are arranged such that an imaging range exceeding a shortest imaging distance of each of the imaging parts is overlapped by the angles of view of two or more pairs of the imaging parts.

(3)

The all-celestial imaging apparatus described in the above or (2), in which the plural imaging parts are arranged such that all directions of 360° of a sphere centering the all-celestial imaging apparatus are each overlapped by angles of view of two or more pairs of the imaging parts.

(4)

The all-celestial imaging apparatus described in the above (1) or (2), in which the plural imaging parts are arranged such that all directions of 360° excluding a portion of a sphere centering the all-celestial imaging apparatus are each overlapped by angles of view of two or more pairs of the imaging parts.

(5)

The all-celestial imaging apparatus described in the above (1) or (2), in which the plural imaging parts are arranged such that all directions of 360° excluding at least one of a top portion or a bottom portion of a sphere centering the all-celestial imaging apparatus are each overlapped by angles of view of two or more pairs of the imaging parts.

(6)

The all-celestial imaging apparatus described in any one of the above (1) to (5), in which the plural imaging parts are arranged being stacked on each other in at least two or more tiers such that all the imaging ranges on at least one circumference of the imaging ranges by the plural imaging parts are each overlapped by angles of view of two or more pairs of the imaging parts.

(7)

The all-celestial imaging apparatus described in any one of the above (1) to (6), in which the plural imaging parts are arranged such that an angle β of view of the imaging part, an arrangement radius r from a center of the all-celestial imaging apparatus to the imaging parts, a shortest distance t enabling calculation of depth information that indicates a distance to an object to be imaged, and a deemed angle θ of view of the imaging part seen from the center of the all-celestial imaging apparatus satisfy a relational equation (2).

[Math. 2]

$$\frac{(r+t)\sin\frac{\theta}{2}}{\sin\frac{\beta}{2}}\cos\frac{\beta}{2} + 2(r+t)\sin\frac{\theta}{4}\cos\left(\frac{\pi}{2}-\frac{\theta}{4}\right) = t \quad (2)$$

$$\frac{(r+t)\sin\frac{\theta}{2}}{\tan\frac{\beta}{2}} + 2(r+t)\sin\frac{\theta}{4}\sin\frac{\theta}{4} = t$$

$$\frac{(r+t)2\tan\frac{\theta}{4}}{\tan\frac{\beta}{2}1+\tan^2\frac{\theta}{4}} + (r+t)\left(1-\cos\frac{\theta}{2}\right) = t$$

$$2\frac{(r+t)}{\tan\frac{\beta}{2}}\tan\frac{\theta}{4} - (r+t)\left(1-\tan^2\frac{\theta}{4}\right) + r\left(1+\tan^2\frac{\theta}{4}\right) = 0$$

$$(2r+t)\tan^2\frac{\theta}{4} + 2\frac{(r+t)}{\tan\frac{\beta}{2}}\tan\frac{\theta}{4} - t = 0$$

$$\tan\frac{\theta}{4} = \frac{-(r+t) \pm \sqrt{(r+t)^2 + t(2r+t)\tan^2\frac{\beta}{2}}}{(2r+t)\tan\frac{\beta}{2}}$$

(8)

The all-celestial imaging apparatus described in any one of the above (1) to (7), in which images imaged by a pair of the imaging parts whose angles of view overlap on each other are used for calculation of depth information that indicates a distance to an object to be imaged.

REFERENCE SIGNS LIST

10 Mirrorless single-lens camera, 20 Dimetric camera, 30 Small camera module

The invention claimed is:

1. An all-celestial imaging apparatus comprising:
a plurality of imaging parts, each imaging part of the plurality of imaging parts being arranged in a direction different from that of other imaging parts of the plurality of imaging parts, wherein
the plurality of imaging parts are arranged such that all imaging ranges on at least one circumference of imaging ranges by the plurality of imaging parts are each overlapped by angles of view of two or more pairs of the plurality of imaging parts,
the plurality of imaging parts are arranged being stacked on each other in at least two or more tiers, and
in a case a vertical angle of view is set to be $\lambda$ for angles of view of two imaging parts of the plurality imaging parts located adjacent to each other in an up-and-down direction in the at least two or more tiers to overlap each other by 50% or more at a distance equal to or larger than a shortest distance t enabling calculation of depth information that indicates a distance to an object to be imaged, a distance d between the two imaging parts is set based on the vertical angle of view and the shortest distance t.

2. The all-celestial imaging apparatus according to claim 1, wherein
the plurality of imaging parts are arranged such that an imaging range exceeding a shortest imaging distance of each imaging part of the plurality of imaging parts is overlapped by the angles of view of two or more pairs of the plurality of imaging parts.

3. The all-celestial imaging apparatus according to claim 2, wherein
the plurality of imaging parts are arranged such that all directions of 360° of a sphere centering the all-celestial imaging apparatus are each overlapped by angles of view of two or more pairs of the plurality of imaging parts.

4. The all-celestial imaging apparatus according to claim 2, wherein
the plurality of imaging parts are arranged such that all directions of 360°, excluding a portion of an outside surface of the all-celestial imaging apparatus, are each overlapped by angles of view of two or more pairs of the plurality of imaging parts.

5. The all-celestial imaging apparatus according to claim 2, wherein
the plurality of imaging parts are arranged such that all directions of 360°, excluding at least one of a top portion or a bottom portion of an outside surface of the all-celestial imaging apparatus, are each overlapped by angles of view of two or more pairs of the plurality of imaging parts.

6. The all-celestial imaging apparatus according to claim 2, wherein
the plurality of imaging parts are arranged being stacked on each other in the at least two or more tiers such that all the imaging ranges on at least one circumference of the imaging ranges by the plurality of imaging parts are each overlapped by angles of view of two or more pairs of the plurality of imaging parts.

7. The all-celestial imaging apparatus according to claim 2, wherein
the plurality of imaging parts are arranged such that an angle $\beta$ of view of the imaging part, an arrangement radius r from a center of the all-celestial imaging apparatus to the plurality of imaging parts, the shortest distance t enabling calculation of depth information that indicates the distance to the object to be imaged, and a deemed angle $\theta$ of view of the imaging part seen from the center of the all-celestial imaging apparatus satisfy a relational equation (2)

[Math. 2]

$$\frac{(r+t)\sin\frac{\theta}{2}}{\sin\frac{\beta}{2}}\cos\frac{\beta}{2} + 2(r+t)\sin\frac{\theta}{4}\cos\left(\frac{\pi}{2} - \frac{\theta}{4}\right) = t \quad (2)$$

$$\frac{(r+t)\sin\frac{\theta}{2}}{\tan\frac{\beta}{2}} + 2(r+t)\sin\frac{\theta}{4}\sin\frac{\theta}{4} = t$$

$$\frac{(r+t)2\tan\frac{\theta}{4}}{\tan\frac{\beta}{2}1+\tan^2\frac{\theta}{4}} + (r+t)\left(1-\cos\frac{\theta}{2}\right) = t$$

$$2\frac{(r+t)}{\tan\frac{\beta}{2}}\tan\frac{\theta}{4} - (r+t)\left(1-\tan^2\frac{\theta}{4}\right) + r\left(1+\tan^2\frac{\theta}{4}\right) = 0$$

$$(2r+t)\tan^2\frac{\theta}{4} + 2\frac{(r+t)}{\tan\frac{\beta}{2}}\tan\frac{\theta}{4} - t = 0$$

$$\tan\frac{\theta}{4} = \frac{-(r+t) \pm \sqrt{(r+t)^2 + t(2r+t)\tan^2\frac{\beta}{2}}}{(2r+t)\tan\frac{\beta}{2}}.$$

8. The all-celestial imaging apparatus according to claim 2, wherein
depth information that indicates a distance to an object to be imaged is calculated based on images imaged by a pair of the plurality of imaging parts whose angles of view overlap on each other.

9. The all-celestial imaging apparatus according to claim 1, in the case the vertical angle of view is set to be $\lambda$ for angles of view of the two imaging parts of the plurality imaging parts located adjacent to each other in the up-and-down direction in the at least two or more tiers to overlap each other by 50% or more at the distance equal to or larger than the shortest distance t, the distance d between the two imaging parts is set to be d=t*tan ($\lambda$/2) or smaller.

* * * * *